United States Patent
Shen et al.

(10) Patent No.: US 11,216,697 B1
(45) Date of Patent: Jan. 4, 2022

(54) BACKWARD COMPATIBLE AND BACKFILL-FREE IMAGE SEARCH SYSTEM

(71) Applicant: Amazon Technologies, Inc., Seattle, WA (US)

(72) Inventors: Yantao Shen, Seattle, WA (US); Yuanjun Xiong, Seattle, WA (US); Siqi Deng, Seattle, WA (US); Wei Xia, Seattle, WA (US); Shuo Yang, Seattle, WA (US); Yifan Xing, Bellevue, WA (US); Wei Li, Seattle, WA (US); Stefano Soatto, Pasadena, CA (US)

(73) Assignee: Amazon Technologies, Inc., Seattle, WA (US)

(*) Notice: Subject to any disclaimer, the term of this patent is extended or adjusted under 35 U.S.C. 154(b) by 36 days.

(21) Appl. No.: 16/815,787

(22) Filed: Mar. 11, 2020

(51) Int. Cl.
 *G06K 9/62* (2006.01)
 *G06K 9/00* (2006.01)
 *G06N 20/00* (2019.01)
 *G06F 16/538* (2019.01)

(52) U.S. Cl.
 CPC ......... *G06K 9/6256* (2013.01); *G06F 16/538* (2019.01); *G06K 9/00268* (2013.01); *G06K 9/00288* (2013.01); *G06K 9/6267* (2013.01); *G06N 20/00* (2019.01)

(58) Field of Classification Search
 CPC ............... G06K 9/6256; G06K 9/6267; G06K 9/00288; G06K 9/00268; G06N 20/00; G06F 16/538
 USPC .......................................................... 382/118
 See application file for complete search history.

(56) References Cited

U.S. PATENT DOCUMENTS

| | | | |
|---|---|---|---|
| 10,909,459 B2* | 2/2021 | Tsatsin | G06N 3/084 |
| 2019/0102651 A1* | 4/2019 | Song | G06N 20/00 |
| 2020/0151438 A1* | 5/2020 | Vemulapalli | G06K 9/00302 |
| 2020/0250537 A1* | 8/2020 | Li | G06K 9/6254 |
| 2020/0300970 A1* | 9/2020 | Nguyen | G01S 7/412 |
| 2020/0311798 A1* | 10/2020 | Forsyth | G06K 9/726 |
| 2021/0125001 A1* | 4/2021 | Guo | G06K 9/6259 |

OTHER PUBLICATIONS

Ahmed et al., "An Improved Deep Learning Architecture For Person Re-identification", In Proceedings of the IEEE Conference on Computer Vision and Pattern Recognition, 2015, pp. 3908-3916.
Bansal et al., "A Case for Backward Compatibility for Human-ai Teams", Available Online at <https://arxiv.org/pdf/1906.01148.pdf>, 2019, 8 pages.
Bendale et al., "Towards Open Set Deep Networks", In Proceedings of the IEEE Conference on Computer Vision and Pattern Recognition, 2016. pp. 1563-1572.

(Continued)

*Primary Examiner* — Juan A Torres
(74) *Attorney, Agent, or Firm* — Nicholson De Vos Webster & Elliott LLP

(57) ABSTRACT

Techniques for building a backward compatible and backfill-free image search system are described. According to some embodiments, a backwards compatible training system trains a new embedding model to be backward compatible with the face embeddings (e.g., floating-point vectors) generated by a previous embedding model. In one embodiment, backwards compatible training uses a classifier of the previous embedding model as a form of constraint in the training of the new embedding model.

20 Claims, 7 Drawing Sheets

(56) References Cited

OTHER PUBLICATIONS

Bousmalis et al., "Domain Separation Networks", In Advances in Neural Information Processing Systems, 2016, pp. 343-351.
Busto et al., "Open Set Domain Adaptation", In Proceedings of the IEEE International Conference on Computer Vision, 2017, pp. 754-763.
Deng et al., "Additive Angular Margin Loss For Deep Face Recognition", In Proceedings of the IEEE Conference on Computer Vision and Pattern Recognition, 2019, pp. 4690-4699.
Gordo et al., "Deep Image Retrieval: Learning Global Representations for Image Search", In European conference on computer vision, Springer, 2016, pp. 241-257.
He et al., "Deep Residual Learning For Image Recognition", In Proceedings of the IEEE Conference on Computer Vision and Pattern Recognition, 2016, pp. 770-778.
Hermans et al., "In Defense of the Triplet Loss For Person Re-identification", Available Online at <ahttps://arxiv.org/pdf/1703.07737.pdf>, 2017, pp. 1-17.
Hinton et al., "Distilling The Knowledge in a Neural Network" Available ONline at <https://arxiv.org/pdf/1503.02531.pdf>, 2015, pp. 1-9.
Hong et al., "Conditional Generative Adversarial Network For Structured Domain Adaptation", In Proceedings of the IEEE Conference on Computer Vision and Pattern Recognition, 2018, pp. 1335-1344.
Hou et al., "Learning A Unified Classifier Incrementally via Rebalancing", In Proceedings of the IEEE Conference on Computer Vision and Pattern Recognition, 2019, pp. 831-839.
Krizhevsky et al., "ImageNet Classification With Deep Convolutional Neural Networks", In Advances in Neural Information Processing Systems, 2012, pp. 1097-1105.
Li et al., "Convergent Learning: Do Different Neural Networks Learn the Same Representations?", Conference Paper at ICLR, 2016, pp. 1-21.
Li et al., "DeepReID: Deep Filter Pairing Neural Network for Person Reidentification", In Proceedings of the IEEE Conference on Computer Vision and Pattern Recognition, 2014, pp. 152-159.
Li et al., "Learning Without Forgetting", IEEE Transactions on Pattern Analysis and Machine Intelligence, 40(12), 2017, pp. 2935-2947.
Liu et al., "SphereFace: Deep Hypersphere Embedding For Face Recognition", In Proceedings of the IEEE Conference on Computer Vision and Pattern Recognition, , 2017, pp. 212-220.
Long et al., "Learning Transferable Features with Deep Adaptation Networks", Available Online at <https://arxiv.org/pdf/1502.02791.pdf>, 2015, 9 pages.
Maze et al., "IARPA Janus Benchmark—C: Face Dataset and Protocol". In 2018 International Conference on Biometrics (ICB), IEEE, 2018, pp. 58-165.
Parameswaran et al., "Large Margin Multi-Task Metric Learning", In Advances in Neural Information Processing Systems, 2010, pp. 1867-1875.
Parisi et al., "Continual Lifelong Learning With Neural Networks: A Review", Neural Networks, 2019, 29 pages.
Parkhi et al., "Deep Face Recognition", British Machine Vision Conference, 2015, pp. 1-4.
Rebuffi et al., "iCaRL: Incremental Classifier and Representation Learning", In Proceedings of the IEEE Conference on Computer Vision and Pattern Recognition, Apr. 14, 2017, pp. 1-15.
Scheirer et al., "Probability Models for Open Set Recognition", IEEE Transactions on Pattern Analysis and Machine Intelligence, vol. 10(10), Mar. 2014, 10 pages.
Scheirer et al., "Towards Open Set Recognition", IEEE Transactions on Pattern Analysis and Machine Intelligence, vol. 10 (10), Aug. 2011, pp. 1-14.
Schroff et al., "FaceNet: A Unified Embedding for Face Recognition and Clustering", In Proceedings of the IEEE Conference on Computer Vision and Pattern Recognition, 2015, pp. 815-823.
Sulc et al., "Improving CNN Classifiers By Estimating Test-Time Priors", In The IEEE International Conference on Computer Vision (ICCV) Workshops, Oct. 2019, pp. 1-9.
Sun et al., "Deep Learning Face Representation by Joint Identification-Verification", In Advances in Neural Information Processing Systems, 2014, pp. 1988-1996.
Szegedy et al., "Going Deeper With Convolutions", In Proceedings of the IEEE Conference on Computer Vision and Pattern Recognition, 2015, pp. 1-12.
Tzeng et al., "Deep Domain Confusion: Maximizing for Domain Invariance", 2014, pp. 1-9.
Wang et al., "CosFace Large Margin Cosine Loss for Deep Face Recognition", In Proceedings of the IEEE Conference on Computer Vision and Pattern Recognition, 2018, 11 pages.
Wang et al., "Deep Visual Domain Adaptation: A Survey", NeuroComputing, 2018, pp. 1-20.
Wang et al., "NormFace: L2 Hypersphere Embedding for Face Verification", In Proceedings of the 25th ACM International Conference on Multimedia, ACM, 2017, pp. 1041-1049.
Wang et al., "The Devil of Face Recognition is in the Noise", In Proceedings of the European Conference on Computer Vision (ECCV), 2018, 16 pages.
Xiao et al., Learning Deep Feature Representations with Domain Guided Dropout for Person Re-Identification, In Proceedings of the IEEE Conference on Computer Vision and Pattern Recognition, 2016, pp. 1249-1258.
Yan et al., "Mind the Class Weight Bias: Weighted Maximum Mean Discrepancy for Unsupervised Domain Adaptation", Proceedings of the IEEE Conference on Computer Vision and Pattern Recognition, 2017, pp. 2272-2281.
Yang et al., Neural Aggregation Network for Video Face Recognition, In Proceedings of the IEEE Conference on Computer Vision and Pattern Recognition, 2017, pp. 4362-4371.
Yu et al., "Network Slimming by Slimmable Networks: Towards One-Shot Architecture Search for Channel Numbers", Available Online at <http://www.arxiv-vanity.com/papers/1903.11728/>, 2019, 18 pages.
Yu et al., "Universally Slimmable Networks and Improved Training Techniques", 2019, 11 pages.
Yu et al., "Slimmable Neural Networks", Published as a Conference Paper at ICLR, 2018, pp. 1-12.
Zheng et al., "Scalable Person Re-Identification: A benchmark", In Proceedings of the IEEE International Conference on Computer Vision, 2015, pp. 1116-1124.

* cited by examiner

BACKWARD COMPATIBLE AND BACKFILL-FREE IMAGE SEARCH SYSTEM

BACKGROUND

Facial recognition is a process by which a person within a digital image (such as a photograph or video frame) is identified or verified by a computer. Facial recognition is usually performed by a software application running on a computer that analyzes an image to recognize human faces within the image.

BRIEF DESCRIPTION OF DRAWINGS

Various embodiments in accordance with the present disclosure will be described with reference to the following drawings.

DETAILED DESCRIPTION

Figure 1:
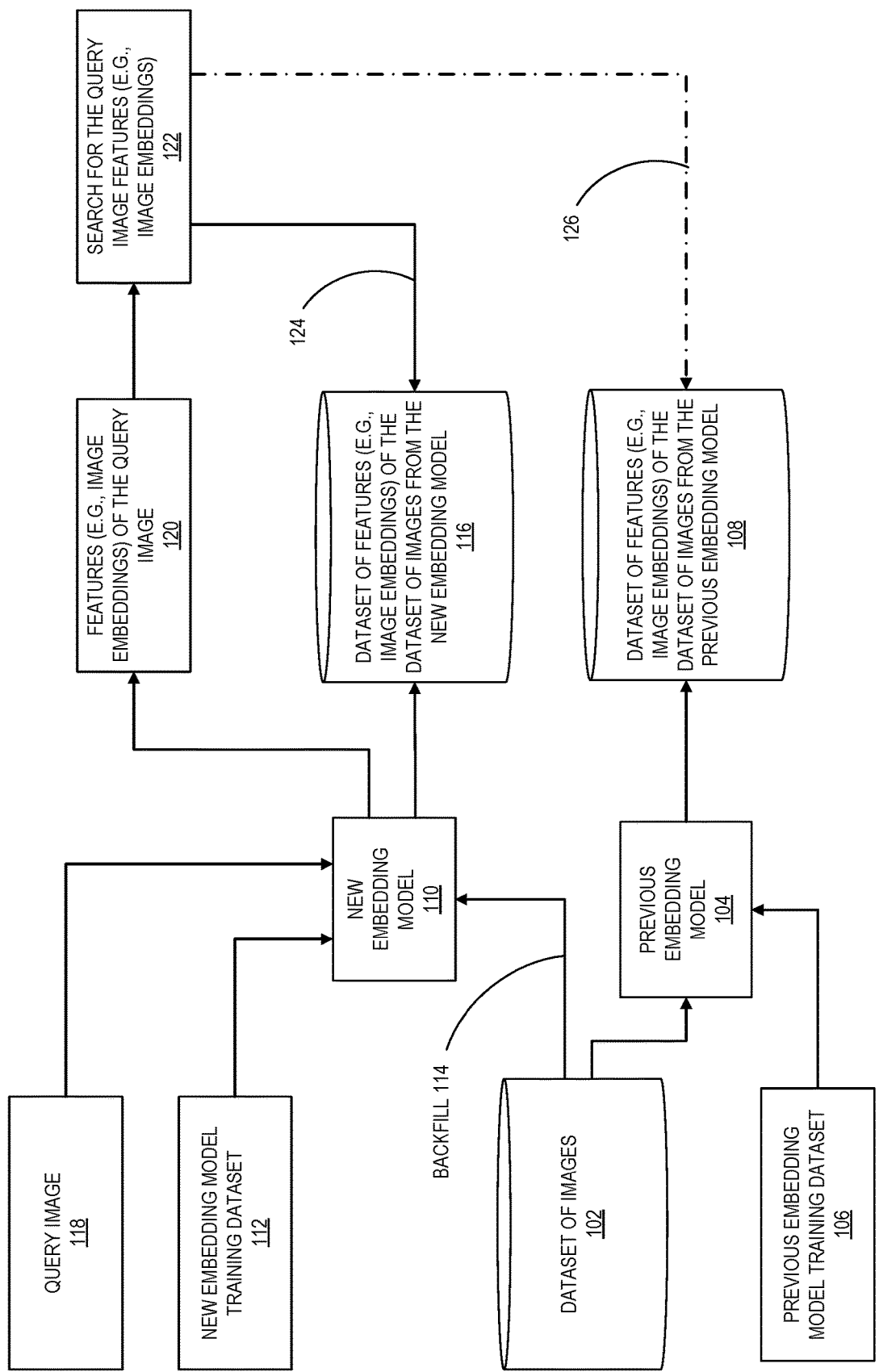
FIG. 1 is a block diagram illustrating embedding model training without backwards compatibility according to some embodiments.

The present disclosure relates to methods, apparatus, systems, and non-transitory computer-readable storage media for a face search application with continuous updates of an embedding model and method for building backward compatible and backfill-free image search system.

For example, some facial recognition software applications recognize facial features by extracting features from an image with a human face. The features may include the relative position, size and shape of the eyes, nose, mouth, jaw, ears, etc. Certain embodiments herein rely on an embedding model that is trained to generate a set of features from an image. In certain embodiments, an embedding model generates a face embedding (e.g., vector) that represents features of a detected face.

The extracted features (e.g., face embedding) may then be used to identify a face in an image by matching features. Facial recognition software applications may also use a classifier to perform one or more facial recognition tasks based on the extracted features. Example facial recognition tasks include face identification (e.g., identifying a face), face recognition (e.g., identifying a specific face), facial landmark localization (e.g., identifying the parts of a face such as eyes, nose, etc.), and face attributes detection (e.g., estimating an age or gender).

Certain facial recognition software applications (e.g., a cloud-based face search) maintain a set of face embeddings (e.g., as floating-point vectors) for user uploaded images (e.g., a gallery of photos). However, when a new version of an (e.g., face) embedding model is introduced (e.g., a new architecture of model and/or new weights are introduced), the embeddings performed for the previous version of an embedding model will be useless. In certain embodiments, the user (e.g., service provider) is to then ask the users to again process (e.g., and reupload) their images so that the new version of embedding model generates a face embedding (e.g., vector) that represents features of a detected face according to the new version instead of being restricted to use of the old version of the embedding model. This process may be generally referred to as backfill. A user (e.g., service provider) may also need to maintain multiple processing fleets to support extracting embeddings for older versions of embedding models.

Certain embodiments herein alleviate this problem by making the new embedding model (e.g., system utilizing the new embedding model) backward compatible with the face embeddings from one or more previous versions of an embedding model. Thus, a user (e.g., a customer of a service provider) can start to enjoy the benefit of a newer (e.g., better) face embedding model while not needing to again process (e.g., and reupload) previously processed (e.g., uploaded) images, for example, in a system that stores the embeddings but does not store the images those embeddings are generated from. In certain embodiments, a backward compatible embedding model allows for the generation of embeddings (e.g., dataset of features) with the updated embedding model for existing embeddings generated by the previous embedding model to not be performed at all or to be conducted gradually to reduce computational cost and maintenance burden. A face search, application programming interface (API) according to the disclosure herein may be referred to as a backfill-free face search API.

Certain embodiments herein are directed to training a new embedding model to be backward compatible with the face embeddings of a previous embedding model, e.g., generally referred to as backward compatible training. In one embodiment, backward compatible training uses a classifier model of (e.g., according to) the previous version of embedding model as a form of training constraint. For example, such that the constraint requires that the embedding of the model under training still work with the classifier model of the previous version model (e.g., generally referred to as the compatibility target). By enforcing this constraint, the new model's embeddings can be used interchangeably with embeddings generated according to the previous version of embedding model.

In certain embodiments, an image search system includes an embedding model to generate face embeddings and a classifier model to generate a score for a class or classes searched for with the face embeddings. In one embodiment, a to-be-searched face embedding (e.g., generated by the new embedding model) is input into a classifier model and the output is a score corresponding to a probability of the searched faced embedding matching one or more face embeddings generated by an embedding model (e.g., the previous embedding model).

In certain embodiments, backward compatibility training allows a backfill-free face search. As one example, a first version of face embedding is stored for each user uploaded face image and, when a new version face embedding system is deployed, the search query images are processed by the new embedding model. With backwards compatibility training, the extracted embedding for the search query image is compared (e.g., matched) against the gallery represented by the previous version's embeddings, for example, compared by a classifier model. Due to the compatibility between models, the search results are not negatively affected by using the previous version's embedding for the query image.

In one embodiment, a newly uploaded gallery photo (e.g., as the corpus of images to be searched in response to a search for a query image) has its embeddings generated by the new embedding model. A customer can immediately start to benefit from the new version of the embedding model. A customer can choose to perform gradual backfill (e.g., at a low cloud computation cost period) and/or use the existing gallery as is and add new photos.

Certain embodiments of backward compatible embedding models trained with pairwise backward compatible training automatically exhibits chain compatibility. That is, when a second model is trained with a compatibility target of first model, and a third model is trained with the compatibility target as the second model, the third model is automatically compatible with the first model, e.g., and the second model's and the third model's accuracies are not affected by using the backward compatible training as compared with non-backward compatible training Certain embodiments herein provide for a new design of a cloud-based face identification (search) API.

Certain embodiments herein are directed to a way to learn visual features that are compatible with previously computed ones even when they have different dimensions and are learned via different neural network architectures and loss functions. In certain embodiments, compatibility means that, if such features are used to compare images, then "new" features can be compared directly to "old" features, so they can be used interchangeably. This enables visual search systems to bypass computing new features (e.g., embeddings) for all previously seen images when updating the embedding models, which may be generally referred to as backfilling. In certain embodiments, backwards compatibility is critical for quickly applying new embedding models that leverage ever-growing large-scale training datasets and improvements in deep learning architectures and training methods. Certain embodiments herein are directed to a new framework to train embedding models, called backward-compatible training (BCT), as a first step towards backward compatible representation learning. In embodiments of learning embeddings for face recognition, models trained with BCT successfully achieve backward compatibility without sacrificing accuracy, thus enabling backfill-free model updates of visual (e.g., face) embeddings.

Visual classification in an "open universe" setting may be accomplished by mapping each image onto a vector space using a model (e.g., one or more functions thereof) implemented by a deep neural network (DNN). The output of such a model in response to an image may be referred to as its "embedding". Dissimilarity between a pair of images can then be measured by some type of distance between their embeddings (e.g., embedding vectors). For a good embedding, different classes of images are expected to be represented by different clusters in the embedding space in certain embodiments. In one embodiment, an embedding model is trained such that the (e.g., Euclidean) distance between embedding vectors generated for the same class of image is made smaller and the vectors generated for different identities is made larger.

As images of a new class become available, their embedding vectors may be used to spawn a new cluster in the open universe, possibly modifying its metric to avoid crowding, in a form of "life-long learning." This process may be referred to as indexing. An application may have millions, or in some cases billions, of images indexed into hundreds of thousands to millions of clusters. This collection of images may be referred to as the gallery set. One use for the indexed gallery is to identify the closest clusters to one or a set of input images, a process that may be referred to as visual search or visual retrieval. The set of input images for this task may be referred to as the query set. Besides the gallery and the query image, there may also be a separate large repository of (e.g., labeled) images used for training the embedding model, that may be referred to as the embedding training set.

FIG. 1 is a block diagram illustrating embedding model training without backwards compatibility according to some embodiments. In FIG. 1, there is a dataset of images 102 (e.g., a gallery of images). A previous embedding model 104, e.g., trained to generate embedding vectors according to training dataset 106, is used to generate a dataset of features 108 (e.g., face embeddings) for the dataset of images 102. It may be desired to utilize a new embedding model 110, e.g., trained to generate embeddings (e.g., embedding vectors) according to training dataset 112, going forward (e.g., by a service provider). However, query image 118 that is input into new embedding model 110 may generate a different embedding (e.g., embedding vector) than if input into previous embedding model 104, for example, such that for a same image, the embeddings generated by new embedding model 110 are in a different vector space than the embeddings generated by previous embedding model 104. In certain embodiments, for a search of a feature 120 (e.g., embeddings generated by second embedding model 110 for an image to be searched) in dataset of features 108 (e.g., face embeddings), it is required that a new, different dataset of features 116 be generated (e.g., backfill 114) by second embedding model 110 for the dataset of images 102 that have already been processed. Thus, in certain embodiments, a search 122 for a feature 120 generated for a query image by second embedding model 110 can be successfully performed 124 on dataset of features 116, but not successfully performed 126 on dataset of features 108.

In certain embodiments without backward compatible representation, to update the embedding model for a retrieval system, all previously processed gallery features (e.g., embeddings) have to be recomputed by the new model (e.g., "backfilling"), as the new embedding cannot be directly compared with the old one. With a backward compatible representation, direct comparison becomes possible, thus eliminating the need to backfill in certain embodiments.

For example, as time goes by, datasets may grow, and the quality of the embeddings may improve with newly trained models. However, to harvest the benefits of new models, it may be necessary for the new models to re-process all images in the gallery set to generate their embedding and re-create the clusters, a process generally known as "backfilling" or "re-indexing." Certain embodiments herein are directed to a system that enables new embedding models (e.g., or an embedding layer of a model) to be deployed without having to re-index existing image collections. A backfill-free system may thus provide backward-compatible representation to data through backward-compatible training.

Certain embodiments herein refer to the problem of backward compatible representation learning in the context of open-set classification, or visual retrieval, however it should be understood the embodiments herein may be used for other feature classification or retrieval. Certain embodiments herein allow for a new model to be deployed without having to re-process a previously indexed gallery set. In certain embodiments, backward compatibility requires a new embedding's output to be usable for comparisons against the old embedding model without compromising recognition accuracy. One embodiment of backward compatible training (BCT) adds an influence loss, which uses learned classifier of the old embedding model in the new embedding model training. Certain embodiments herein allow for a backward compatible representation learning with minimal loss of accuracy, enabling backfill-free updates of a model. BCT is robust against multiple changing factors in training an embedding model, e.g., neural network architectures, loss functions, and data growth. In certain embodiments, compatibility between multiple models is attained by chain-like pairwise BCT training.

Embodiments herein improve embedding model learning and open set recognition. Open-set visual recognition is relevant to retrieval face recognition and person re-identification. One approach involves extracting visual features to instantiate test-time classifiers. Deep neural networks (DNNs) may be used to train embedding models using closed-world classification as a surrogate task using various forms of loss functions and supervision methods to improve generalization and/or perform metric learning enforcing affinity for pairs or triplets of representations in the embedding space. Specifically, certain embodiments herein learn a single metric that is compatible for all tasks in a multi-task learning setting.

Embodiments herein improve learning across domains and tasks. In domain adaptation techniques such as maximum mean discrepancy (MMD) and related methods can be used to align the (e.g., marginal) distribution of the new and old classes, included those trained adversarial. Continual learning transfer learning and life-long learning may deal with cases where an existing model is expected to evolve over time. Model distillation may be used as a form of regularization when introducing new classes. Old class centers may be used to regularize samples from the new classes. A framework for learning a unified classifier in the incremental setting may be utilized. A re-training loss function may be utilized. Methods addressing catastrophic forgetting may be used, e.g., with a reason for "forgetting" is the changing of the visual embedding for the subsequent classifiers. Certain embodiments herein instead address the challenge of achieving backward compatibility between any pair of old model and new model, for example, such that the new model is not required to be initialized by or share a similar network architecture as the old model.

Embodiments herein provide for compatible representations. For example, in contrast to a method where it may be possible to map between feature vectors from multiple models trained on the same dataset, or to a method of introduce a design where multiple models with different channel widths but the same architecture share common subsets of parameters and representation, which implicitly imposes the representation from the different models to be compatible. Embodiments herein propose the first approach to solve the problem of backward compatibility in deep learning. Certain embodiments herein are directed to an open-universe classification using metric discriminants Embodiments herein may be used for other kinds of models, trained with different criteria, to be backward-compatible, e.g., for other tasks such as localization or regression.

Figure 2:
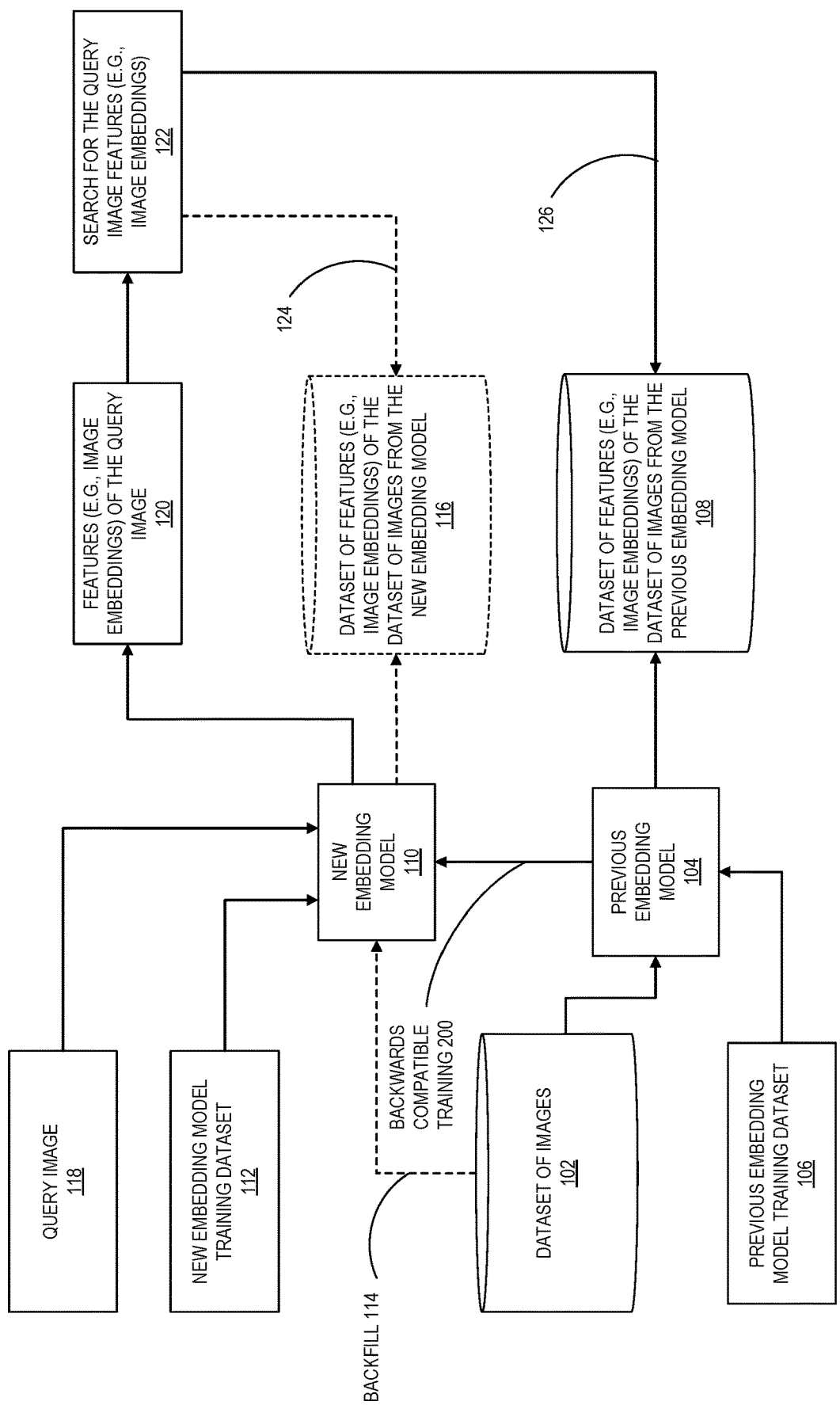
FIG. 2 is a block diagram illustrating embedding model training with backwards compatibility according to some embodiments.

FIG. 2 is a block diagram illustrating embedding model training with backwards compatibility according to some embodiments. In contrast to FIG. 1, instead of a backfill 114, backward compatible training 200 is utilized for new embedding model 110. In one embodiment, a method includes generating a first set of face embeddings 108 from a dataset of images 102 using a first embedding model 104, training a second, different embedding model 110 to generate a second set of face embeddings generated by the second, different embedding model that are compatible with the first set of face embeddings generated from the dataset of images by the first embedding model, generating a third set of face embeddings 120 from a query image 118 from a user using the second, different embedding model 110, and performing a search 122 of the third set of face embeddings from the query image in the first set of face embeddings of the dataset of images using a classifier model to generate a result (the result may then be returned to the user, e.g., as discussed below in reference to FIG. 3). The result may be the closest image or set of images, a label (e.g., a person's name) of the closest image, a probability of being a closest image, a score of the class or classes matched, etc. A new, different dataset of features 116 may be generated (e.g., backfill 114) by second embedding model 110 for the dataset of images 102 that have already been processed. The search 122 may be (e.g., simultaneously) performed 124 on dataset of features 116 and performed 126 on dataset of features 108.

Below is a more detailed discussion of the problem of backward compatible representation learning, a description of a backward compatible training approach and implementations, and then a discussion of an example environment in FIG. 3 that utilizes backward compatible training.

As an example application, the following refers to a photo collection $\mathcal{D}$ serving the role of the image gallery. $\mathcal{D}$ is grouped into a number of classes or identities $Y=\{y_1, \ldots, y_N\}$. Certain embodiments have an embedding model $\Phi_{old}$ that maps each image x onto an embedding vector $z = \Phi_{old}(x) \in R^{K_{old}}$ with $x \in \mathcal{D}$. The embedding model $\Phi_{old}$ is trained on an embedding training set, $\mathcal{T}_{old}$. The embedding of any image produced by $\mathcal{D}$ can then be assigned to a class in $\mathcal{D}$ through some distance d: $R^K \times R^K \rightarrow R_+$. In the simplest case, dropping the subscript "old,", each class in Y is associated with a "prototype" or cluster center $\Phi_i$, $i \in Y$. The vector $\Phi_i$ for the class i can be obtained by a set function $\Phi_i = S(\{\Phi(x)\} \psi_{(x)=i})$, where $\psi(x)$ is the corresponding class label of an image $x \in \mathcal{D}$. Choices of a set function S include averaging and attention models. A test sample x is assigned to the class $\psi = \arg\min_{i \in Y} d(\Phi(x), \Phi_i) \in Y$. Later, a new model $\Phi_{new}$ with $K_{new}$-dimensional embedding vectors becomes available, for instance trained with additional data in the new embedding training set, $\mathcal{T}_{new}$ ($\mathcal{T}_{new}$ can be a superset of $\mathcal{T}_{old}$) or using a different architecture. The new embedding $\Phi_{new}$ is potentially living in a different embedding space and it is possible that $K_{new} \neq K_{old}$.

To harvest the benefit of the new embedding model $\Phi_{new}$, certain embodiments use the $\Phi_{new}$ to process any new images that are joining the gallery set, $\mathcal{D}$, as well as images for the query set. Since the gallery set could get additional images and clusters, it is denoted as $\mathcal{D}_{new} = \mathcal{D} \cup \{x|y= N+1, \ldots, N_{new}\}$, where $N_{new}$ is the number of clusters in $\mathcal{D}_{new}$. Then, the question becomes how to handle images in $\mathcal{D}$. In order to make the system backfill-free, certain embodiments are to directly use the already computed embedding from $\Phi_{old}$ for these images and obtain $\{\Phi_i\}_{,i \leq N}$. The goal, then, in certain embodiments is to design a training process for the new embedding model $\Phi_{new}$ so that any test images can be assigned to classes, new or old, in $\mathcal{D}_{new}$, without the need to compute $\Phi_{new}(\mathcal{D})$, e.g., to backfill. The resulting embedding $\Phi_{new}$, is then a backward compatible representation with $\Phi_{old}$.

Example Criterion for Backward Compatibility

In one embodiment, a model One, is backward compatible if:

$$d(\phi_{new}(x_i),\phi_{old}(x_j)) \geq (\phi_{old}(x_i),\phi_{old}(x_j)), \forall (i,j) \in \{(i,j) | y_i \neq y_j\}$$

and, $$d(\phi_{new}(x_i),\phi_{old}(x_j)) \leq d(\phi_{old}(x_i),\phi_{old}(x_j)), \forall (i,j) \in \{(i,j) | y_i = y_j\}$$

where d(x; y) is the distance between samples x and y in the embedding space. These constraints formalize the fact that the new embedding, when used to compare against the old embedding, must be at least as good as the old one in separating images from different classes and grouping those from the same classes in certain embodiments. Note that the solution $\Phi_{new} = \Phi_{old}$ is backward compatible, obviously. But this trivial solution is removed if the architectures are different and/or the weights are different, e.g., when updating a model. To simplify the below discussion, it is assumed that the embedding dimensions for the two models is the same ($K_{new} = K_{old}$), but the embodiments herein may have different embedding dimensions (e.g., as the number of elements in each embedding vector).

Defining an evaluation metric, $M(\Phi_q, \Phi_g; \mathcal{Q}, \mathcal{D})$ on some testing protocols, e.g., true positive identification rates for face search protocol, where $\mathcal{Q}$ denotes the query set, $\mathcal{D}$ denotes the gallery set, and use $\Phi_q$ for extracting query set feature and $\Phi_g$ for the gallery set. Then a more realistic criterion, the empirical compatibility criterion, for the application can be defined as $$M(\phi_{new},\phi_{old}; \mathcal{Q}, \mathcal{D}) > M(\phi_{old},\phi_{old}; \mathcal{Q}, \mathcal{D}).$$

This criterion can be defined as follows: in an open-set recognition task with a fixed query set and a fixed gallery set, when the accuracy using $\Phi_{new}$ without backfilling for gallery images surpasses that using $\Phi_{old}$, backward compatibility is achieved and the backfill-free update feasible. Note simply setting $\Phi_{new}$ to $\Phi_{old}$ will not satisfy this criterion.

Baseline and Paragon

One approach to train the model $\Phi_{new}$ to be compatible with $\Phi_{old}$, assuming they have the same dimension, is to minimize the $\mathcal{L}^2$ distance between embeddings of the same image. This is enforced for every image in $\mathcal{Y}_{old}$, which is used to train $\Phi_{old}$. It can be added as a regulation term (regularizer) R to the empirical loss $L(\Phi_{new})$ when training the new embedding as $$\phi_{new} = \underset{\phi}{\arg\min} L(\phi, \mathcal{T}_{new}) + \lambda R(\phi), \text{ where}$$

$$R(\phi) = \sum_{x \in \mathcal{T}_{old}} \frac{1}{2} \|\phi(x) - \phi_{old}(x)\|_2^2.$$

The solution above may be referred to as $\Phi_{new} \cdot \mathcal{Y}_2$. Note that in certain embodiments, $\Phi_{old}$ will be fixed during training of $\Phi_{new} \cdot \mathcal{Y}_2$. However, in certain embodiments, $\Phi_{new} \cdot \mathcal{Y}_2$ trained with this approach does not satisfy (2) above and it will not converge to $\Phi_{old}$ since the training set has been changed to $\mathcal{T}_{new}$. So, this approach cannot be used to obtain a backward compatible representation in certain embodiments.

In one embodiment, performing the backfill on $\mathcal{D}$ with the model $\Phi_{new}$, trained without any regularization, can be taken as a paragon. Since the embedding for $\mathcal{D}$ is recomputed, embodiments may thus fully enjoy the benefit of $\Phi_{new}$ but at the cost of reprocessing the gallery. This sets the upper bound of accuracy for the backfill-free update, and thus the upper bound of the update gain.

Example of Backward Compatible Training

Certain embodiments design backward compatible training for the embedding models trained in classification tasks with cross entropy loss. Let $\Phi$ be a model parametrized by two disjoint sets of weights, $\mathcal{Y}_c$ and $\mathcal{Y}_\Phi$. The first parametrizes the classifier k, or the "head" of the model, whereas the second parametrizes the embedding model $\Phi$, so that $\Phi(x) = k_{\mathcal{Y}_c}(\Phi_{\mathcal{Y}_\Phi}(x))$. Now, the cross-entropy loss can be written as $$L(w_c, w_\phi; \mathcal{T}) = \sum_{(x_i,y_i) \in \mathcal{T}} -\log \kappa_{w_c}(\phi_{w_\phi}(x_i))_{y_i}.$$

Note that the classifier $k_{\mathcal{Y}_c}$ can take many forms, from a SoftMax classifier to other, more complex forms. The old model $\Phi_{old}$ is thus obtained by:

$$w_{cold}, w_{\phi old} = \underset{w}{\arg\min} L(w_c, w_\phi; \mathcal{T}_{old}).$$

As for for the new model $\Phi_{new}$, while ordinary training would yield:

$$w_{cnew}, w_{\phi new} = \underset{w}{\arg\min} L(w_c, w_\phi; \mathcal{T}_{new}).$$

to ensure backwards-compatibility, certain embodiments herein add a second term to the loss that depends on classifier of the old model:

$$w_{cnew}, w_{\phi new} = \underset{w}{\arg\min} L_{BCT}(w_c, w_\phi; \mathcal{T}_{new}, \mathcal{T}_{BCT}).$$

where $$L_{BCT}(w_c, w_\phi; \mathcal{T}_{new}; \mathcal{T}_{BCT}) = L(w_c, w_\phi; \mathcal{T}_{new}) + \lambda L(w_{c\_old}, w_\phi; \mathcal{T}_{BCT}).$$

The second term may be referred to as an "influence loss" since it biases the solution towards one that can use the old classifier. Note that $\mathcal{Y}_{c\_old}$ in the influence loss will be fixed during training in certain embodiments. Here, $\mathcal{T}_{BCT}$ is a design parameter, referring to the set of images to apply the influence loss to. It can be either $\mathcal{T}_{old}$ or $\mathcal{T}_{new}$. The approach of using $\mathcal{T}_{new}$ as $\mathcal{T}_{BCT}$ are discussed below. Note that the classifiers k of the new and old models can be different. This method may be referred to as backward compatible training, and the result backward compatible representation or embedding.

Learning with Backward Compatible Training

In the proposed backward compatible training framework, there are several design choices to make.

Form of the classifier: the classifiers k of the new and old models $k_{new}$ and $k_{old}$ can be of the same form, for example, but not limited to, a Softmax classifier, an angular Soft-Max classifier, or a cosine margin classifier. They can also be of different forms, e.g., where better loss formulations are proposed and applied to training embedding models.

Backward compatibility training dataset: one choice for the dataset $\mathcal{T}$ BCT, which the influence loss is applied on, is the $\mathcal{T}_{old}$ used for training the old embedding model $\Phi_{old}$. In certain embodiments, since the old embedding model $\Phi_{old}$ is optimized together with its classifier $k_{old}$ (e.g., classifier model from a search system) on the original training set $\mathcal{T}_{old}$, a new embedding model having a low influence loss will work with the old model's classifier and thus with the embedding vectors from $\Phi_{old}$. A second choice of $\mathcal{T}_{BCT}$ is the $\mathcal{T}_{new}$, and includes not only computing the influence loss on the old training data for $\Phi_{old}$ but also on the new training data. However, this choice poses a challenge in the computation of the loss value $L(\psi_c, \psi \Phi; \mathcal{T}_{new})$ for the images in $\{x|x \in \mathcal{T}_{new}, x \notin \mathcal{T}_{old}\}$, due to the unknown classifiers parameters for the classes.

Below are two methods for computing the loss values for these images:

(1) Synthesized classifier weights. For classes in $\mathcal{T}_{new}$ which are not in the set of classes in $\mathcal{T}_{old}$, create their "synthesized" classifier weights by computing the average feature vector of $\Phi_{old}$ on the images in each class. One embodiment uses averaging as the set function in this case. The synthesized classifier weights for the new classes are concatenated with the existing $w_c$ to form the classifier parameters for the influence loss term.

(2) Knowledge distillation. Certain embodiments herein penalize the relative entropy (e.g., Kullback-Leibler (KL) divergence) of the classifier output probabilities between using $\Phi_{new}$ and $\Phi_{old}$ with existing classifier parameters $w_c$.. This removes the requirement to add new classes in $\mathcal{T}_{new}$ to the classifiers corresponding to $\Phi_{old}$ in certain embodiments.

Thus, backward compatible training is not restricted to a certain neural network architecture or loss function. In certain embodiments, backward compatible training presumes that both the old and new embedding models be trained with classification-based losses, e.g., in open-set recognition problems. In certain embodiments, backward compatible training does not require modification of the architecture nor of the parameters of the old model $\Phi_{old}$.

Figure 3:
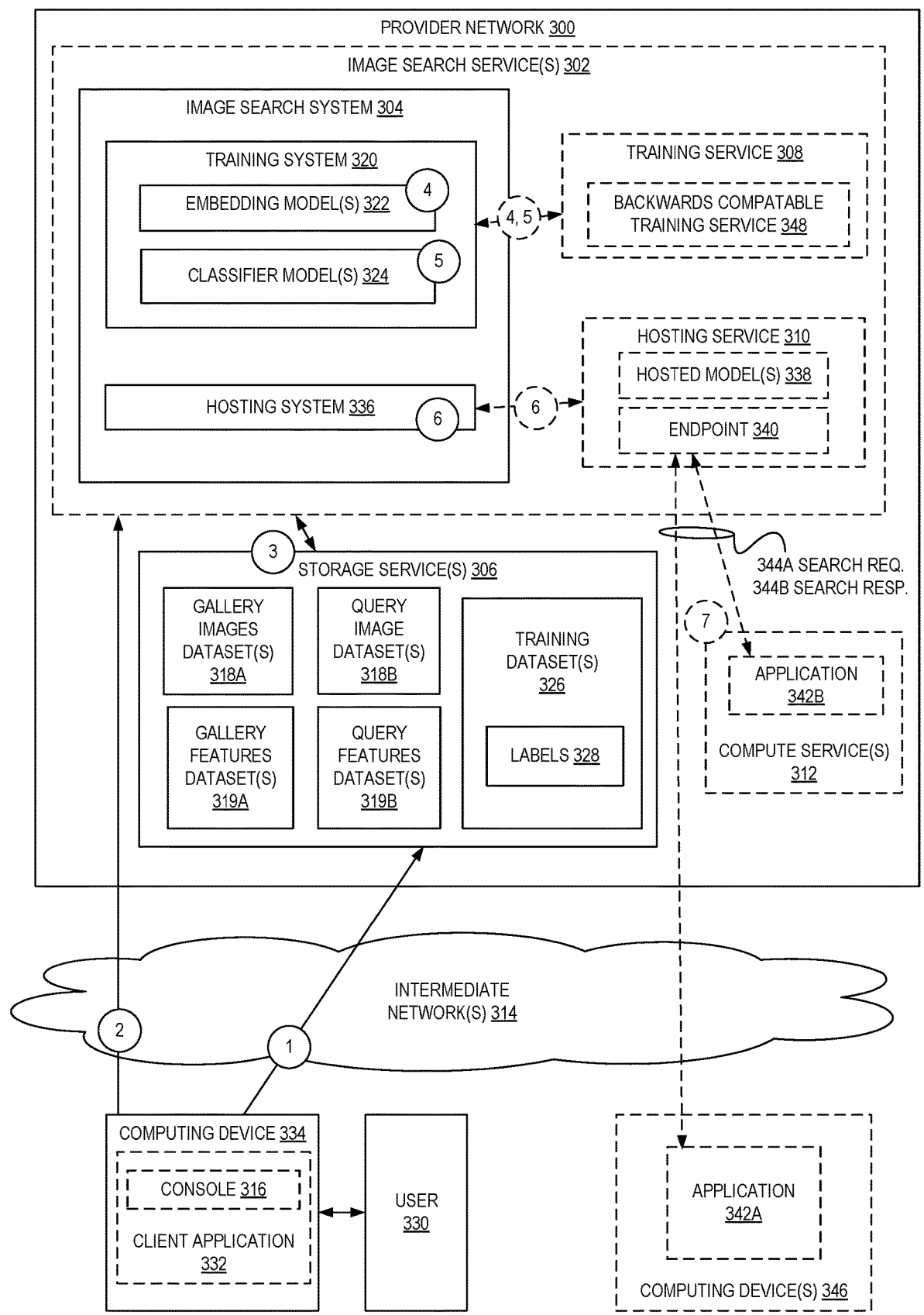
FIG. 3 is a diagram illustrating an environment for creating, training, and using models of an image search service according to some embodiments.

FIG. 3 is a diagram illustrating an environment for creating, training, and using models of an image search service 302 according to some embodiments. FIG. 3 includes an image search system 304, one or more storage services 306, one or more training services 308, one or more hosting service 310, and one or more compute services 312 implemented within a multi-tenant provider network 300. Each of the image search service 302, one or more storage services 306, one or more training services 308, one or more hosting service 310, and one or more compute services 312 may be implemented via software, hardware, or a combination of both, and may be implemented in a distributed manner using multiple different computing devices.

A provider network 300 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 312), a storage service 306 that can store data objects, etc. The users (or "customers") of provider networks 300 may utilize one or more user accounts that are associated with a customer account, though these terms may be used somewhat interchangeably depending upon the context of use. Users may interact with a provider network 300 across one or more intermediate networks 314 (e.g., the internet) via one or more interface(s), such as through use of application programming interface (API) calls, via a console 316 implemented as a website or application, etc. The interface(s) may be part of, or serve as a front-end to, a control plane of the provider network 300 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 300 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 300 by an on-demand code execution service (which may be one of compute service(s) 312) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions (e.g., as an application 342B) that can be executed on demand, without requiring the user to maintain dedicated infrastructure to execute the serverless function. Instead, the serverless functions can be executed on demand using resources maintained by the provider network 300. In some embodiments, these resources may be maintained in a "ready" state (e.g., having a pre-initialized runtime environment configured to execute the serverless functions), allowing the serverless functions to be executed in near real-time.

The image search service 302, in some embodiments, is a machine learning powered service that makes it easy for users to perform facial recognition tasks. Facial recognition tasks may include one or any combination of: face identification (e.g., identifying a face), face recognition (e.g., identifying a specific face), facial landmark localization (e.g., identifying the parts of a face such as eyes, nose, etc.), and face attributes detection (e.g., estimating an age or gender). In some embodiments, the image search service 302—via use of training service 308—allows users to build and use models to perform facial recognition tasks (e.g., on one or more image dataset(s) 318A-B). In some embodiments, the image search service 302 (e.g., training system 320) trains and uses an embedding model 322 and a classifier model 324.

The training system 320, for example, may enable users to generate an embedding model 322 that outputs a set of face embeddings (e.g., vectors) 319A for an input of an image, e.g., from gallery image dataset 318A. The training system 320, for example, may enable users to generate a classifier model 324 that outputs a value or other indication for a facial recognition task from an input of a set of face embeddings (for example, vectors, e.g., the value being a confidence value that an identified image includes an object (e.g., face) that is being searched for in the gallery image dataset 318A.

Embodiments herein allow a customer to create embedding models 322 and/or classifier models 324 by supplying a training dataset 326 (e.g., including labels 328 that indicate a class for certain features). Trained classifiers allow customers to categorize input images (e.g., of similar nature to those used at training time but previously unseen) into a set of classes. In certain embodiment, a labeled dataset 326 required for training consists of images with a desired class associated with them.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and testing data); model selection; model training; model evaluation; and status reporting. Inference may include the following responsibilities: model loading and hosting; and inference (e.g., synchronous and batch).

Training may include using a hyperparameter optimization (HPO) pipeline to evaluate a plurality of models and respective configurations. Training may perform a grid search over the matrix of experiments (e.g., defined upfront) in search for the model and its parameters that performs best on the given dataset.

Thus, a user 330 may provide or otherwise identify a training dataset 326 with labels 328 (e.g., face embeddings for images and their corresponding labels 328) for use in creating a model. For example, as shown at circle (1), the user 330 may utilize a client application 332 executed by a computing device 334 (e.g., a web-application implementing a console 316 for the provider network 300, a standalone application, another web-application of another entity that utilizes the image search service 302 as a part of its backend, a database or mixed-SQL environment, etc.) to cause the computing device 334 to upload the training dataset 326 with labels 328 to a storage location (e.g., provided by a storage service 306 such as an object storage service of a provider network 300).

Thereafter, at circle (2) the computing device 334 may issue one or more requests (e.g., API calls) to the image search service 302 that indicate the user's 330 desire to train an embedding model 322 and/or a classifier model 324. The request may be of a type that identifies which type of model is to be created, e.g., CreateEmbeddingModel for creating an embedding model 322, CreateClassifierModel for creating a classifier model 324, etc. The request may also include one or more of an identifier of a storage location or locations storing the training dataset 326 (e.g., an identifier of just the documents, an identifier of just the labels 328, an identifier associated with both the documents and labels, etc.), which may identify a storage location (e.g., via a Uniform Resource Locator (URL), a bucket/folder identifier, etc.) within the provider network 300 (e.g., as offered by a storage service 306) or external to the provider network 300, a format identifier of the dataset 326, a language identifier of the language of the dataset 326, labels 328, etc.

Responsive to receipt of the request, the training system 320 of the image search service 302 is invoked and begins operations for training the corresponding type of model(s).

In some embodiments, the training (at circle (4)) of the embedding model 322 and/or the training (at circle (5)) of the classifier model 324 includes use (at optional, dotted circle (4) and (5), respectively) of a separate training service 308 of image search service 302; similarly, the hosting system 336 may make use (at optional, dotted circle (6)) of a hosting service 310 of an image search service 302 to deploy a model as a hosted model 338 in association with an endpoint 340 that can receive search requests from client applications 342A and/or 342B at circle (7), provide the inference requests 344A to the associated hosted model(s) 338, and provide search results 344B (e.g., predicted person, etc.) back to applications 342A and/or 342B, which may be executed by one or more computing devices 346 outside of the provider network 300 or by one or more computing devices of a compute service 312 (e.g., hardware virtualization service, serverless code execution service, etc.) within the provider network 300.

For example, when a user 330 desires to train an embedding model 322, an embedding model training dataset of the training dataset 326 may be used. Dissimilarity between a pair of images can be measured by some type of distance between their embeddings (e.g., embedding vectors). For a good embedding, different classes of images are expected to be represented by different clusters in the embedding space in certain embodiments. In one embodiment, an embedding model is trained such that the (e.g., Euclidean) distance between embedding vectors generated for the same class of image is made smaller and the vectors generated for different identities is made larger. In one embodiment, an embedding model is trained (e.g., with known features and a known face) to extract features from an image including a face and predict a multiple element vector representation of these features (e.g., referred to as a face embedding).

As another example, when a user 330 desires to train a classifier model 324, a classifier model training dataset of the training dataset 326 may be used. In one embodiment, a classifier model is trained to receive a face embedding as an input and output a value or other indication for a facial recognition task (e.g., output an indication of a most probable person depicted in the query image). The indication may be a name of a person and/or an image of the person. In one embodiment, a classifier model is trained (e.g., with images of a person labeled with an indication of the person) to output a value or other indication of a person based on an input of a face embedding for a query image. The face embedding may be generated by embedding model 322.

Thus, a trained embedding model 322 may receive an input of an image dataset 318A-B and output a features dataset 319A or 319B for the image dataset. In one embodiment, image dataset 318A is a gallery as discussed herein. Feature dataset 319A may be used by a classifier as the search corpus for a query image input into image search service 302.

However, it may be desires to have change the embedding model (e.g., embedding model of hosted model 338). Certain embodiments herein utilize backward compatible training service 348, for example, so that images from dataset 318A that have already had their features extracted (e.g., as embeddings stored in dataset 319A) are able to be correctly used with a new embedding model. In one embodiment, a first embedding model 322 is to be replaced by a second embedding model. Backwards compatible training service 348 is thus to perform a backwards compatible training as discussed herein. After the training is complete, the (trained and backward compatible second embedding model may be deployed as hosted model 338. In one embodiment, a user 330 (or application 342A or 342B) searches a gallery image dataset(s) 318A produced at least in part by the first embedding model for an image by using an embedding generated by the second embedding model.

Figure 4:
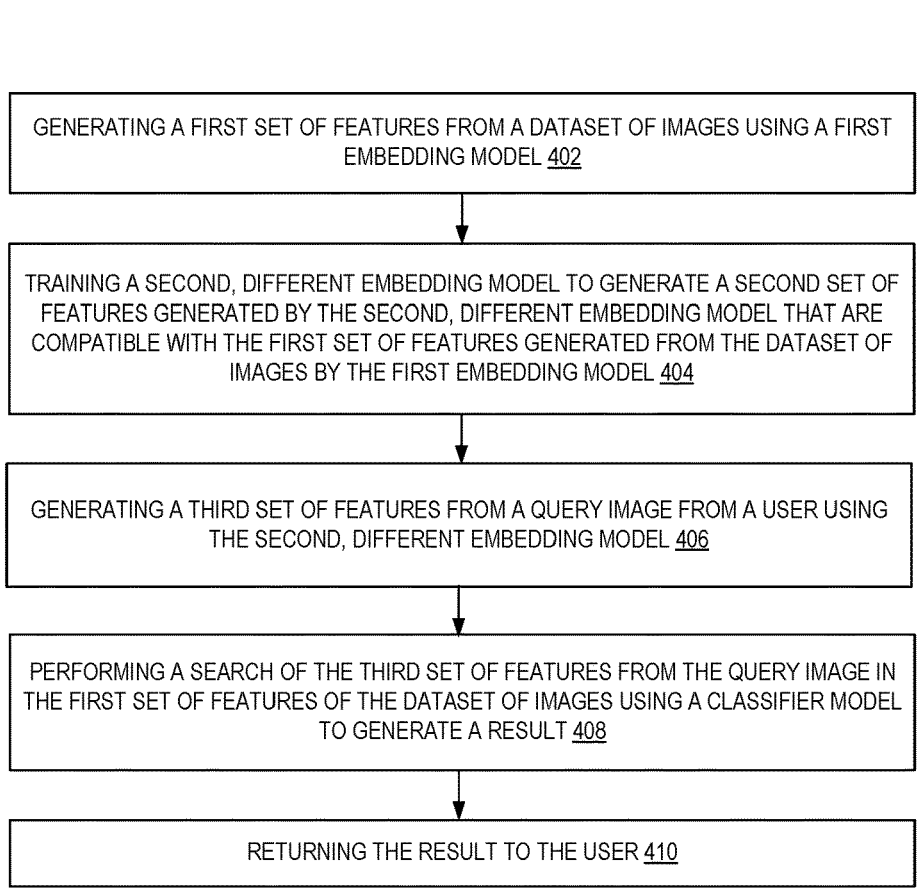
FIG. 4 is a flow diagram illustrating operations of a method for training and using an embedding model according to some embodiments.

FIG. 4 is a flow diagram illustrating operations of a method for training and using an embedding model according to some embodiments. Some or all of the operations 400 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory.

Depicted operations 400 includes generating a first set of features from a dataset of images using a first embedding model 402, training a second, different embedding model to generate a second set of features generated by the second, different embedding model that are compatible with the first set of features generated from the dataset of images by the first embedding model 404, generating a third set of features from a query image from a user using the second, different embedding model 406, performing a search of the third set of features from the query image in the first set of features of the dataset of images using a classifier model to generate a result 408, and returning the result to the user 410. The result may be an indication (e.g., identity) of a particular person for a face search or verification of an authorized user for a face verification.

In certain embodiments, the training of the second embedding is thus dependent on the training of the first embedding. In certain embodiments, backward compatible representation learning only requires both the new and the old embedding models to be learned with classification-based supervision, e.g., without the need for pretraining or initialization from the old model.

Figure 5:
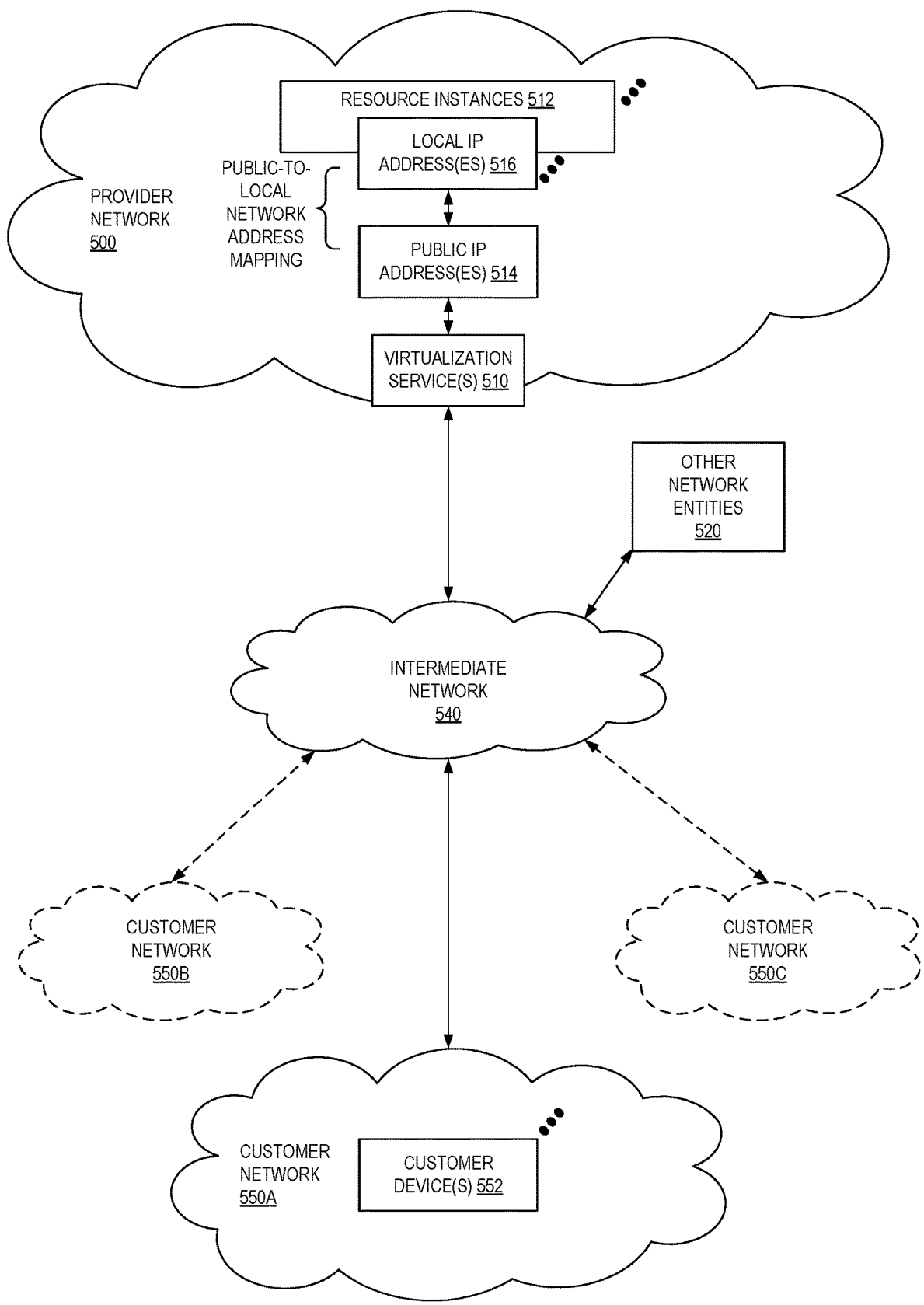
FIG. 5 illustrates an example provider network environment according to some embodiments.

FIG. 5 illustrates an example provider network (or "service provider system") environment according to some embodiments. A provider network 500 may provide resource virtualization to customers via one or more virtualization services 510 that allow customers to purchase, rent, or otherwise obtain instances 512 of virtualized resources, including but not limited to computation and storage resources, implemented on devices within the provider network or networks in one or more data centers. Local Internet Protocol (IP) addresses 516 may be associated with the resource instances 512; the local IP addresses are the internal network addresses of the resource instances 512 on the provider network 500. In some embodiments, the provider network 500 may also provide public IP addresses 514 and/or public IP address ranges (e.g., Internet Protocol version 4 (IPv4) or Internet Protocol version 6 (IPv6) addresses) that customers may obtain from the provider 500.

Conventionally, the provider network 500, via the virtualization services 510, may allow a customer of the service provider (e.g., a customer that operates one or more client networks 550A-550C including one or more customer device(s) 552) to dynamically associate at least some public IP addresses 514 assigned or allocated to the customer with particular resource instances 512 assigned to the customer. The provider network 500 may also allow the customer to remap a public IP address 514, previously mapped to one virtualized computing resource instance 512 allocated to the customer, to another virtualized computing resource instance 512 that is also allocated to the customer. Using the virtualized computing resource instances 512 and public IP addresses 514 provided by the service provider, a customer of the service provider such as the operator of customer network(s) 550A-550C may, for example, implement customer-specific applications and present the customer's applications on an intermediate network 540, such as the Internet. Other network entities 520 on the intermediate network 540 may then generate traffic to a destination public IP address 514 published by the customer network(s) 550A-550C; the traffic is routed to the service provider data center, and at the data center is routed, via a network substrate, to the local IP address 516 of the virtualized computing resource instance 512 currently mapped to the destination public IP address 514. Similarly, response traffic from the virtualized computing resource instance 512 may be routed via the network substrate back onto the intermediate network 540 to the source entity 520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 500; a customer may then assign their allocated public IP addresses to particular resource instances allocated to the customer. These public IP addresses may be referred to as customer public IP addresses, or simply customer IP addresses. Instead of being assigned by the provider network 500 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 6:
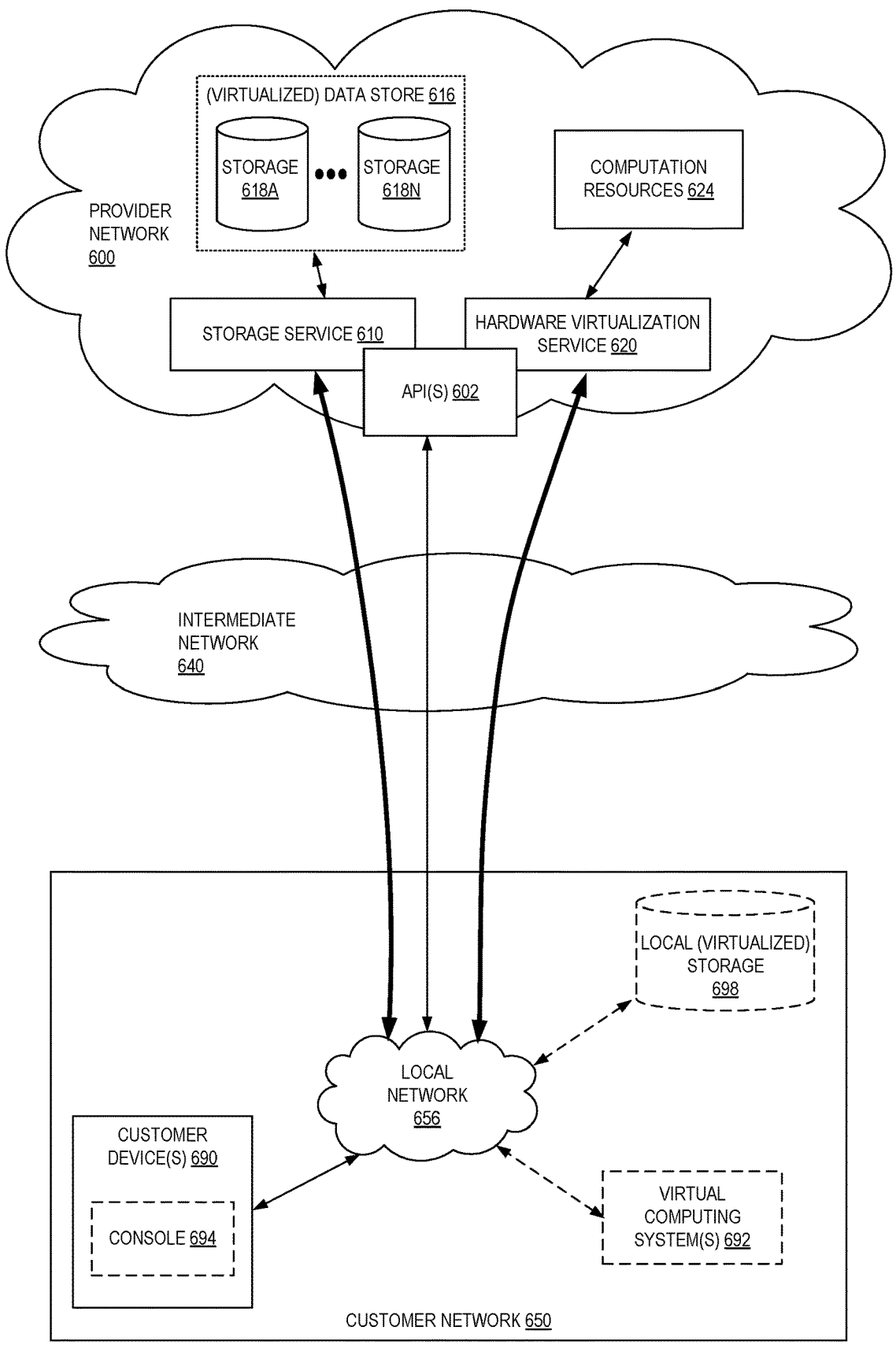
FIG. 6 is a block diagram of an example provider network that provides a storage service and a hardware virtualization service to customers according to some embodiments.

FIG. 6 is a block diagram of an example provider network that provides a storage service and a hardware virtualization service to customers, according to some embodiments. Hardware virtualization service 620 provides multiple computation resources 624 (e.g., VMs) to customers. The computation resources 624 may, for example, be rented or leased to customers of the provider network 600 (e.g., to a customer that implements customer network 650). Each computation resource 624 may be provided with one or more local IP addresses. Provider network 600 may be configured to route packets from the local IP addresses of the computation resources 624 to public Internet destinations, and from public Internet sources to the local IP addresses of computation resources 624.

Provider network 600 may provide a customer network 650, for example coupled to intermediate network 640 via local network 656, the ability to implement virtual computing systems 692 via hardware virtualization service 620 coupled to intermediate network 640 and to provider network 600. In some embodiments, hardware virtualization service 620 may provide one or more APIs 602, for example a web services interface, via which a customer network 650 may access functionality provided by the hardware virtualization service 620, for example via a console 694 (e.g., a web-based application, standalone application, mobile application, etc.). In some embodiments, at the provider network 600, each virtual computing system 692 at customer network 650 may correspond to a computation resource 624 that is leased, rented, or otherwise provided to customer network 650.

From an instance of a virtual computing system 692 and/or another customer device 690 (e.g., via console 694), the customer may access the functionality of storage service 610, for example via one or more APIs 602, to access data from and store data to storage resources 618A-618N of a virtual data store 616 (e.g., a folder or "bucket", a virtualized volume, a database, etc.) provided by the provider network 600. In some embodiments, a virtualized data store gateway (not shown) may be provided at the customer network 650 that may locally cache at least some data, for example frequently-accessed or critical data, and that may communicate with storage service 610 via one or more communications channels to upload new or modified data from a local cache so that the primary store of data (virtualized data store 616) is maintained. In some embodiments, a user, via a virtual computing system 692 and/or on another customer device 690, may mount and access virtual data store 616 volumes via storage service 610 acting as a storage virtualization service, and these volumes may appear to the user as local (virtualized) storage 698.

While not shown in FIG. 6, the virtualization service(s) may also be accessed from resource instances within the provider network 600 via API(s) 602. For example, a customer, appliance service provider, or other entity may access a virtualization service from within a respective virtual network on the provider network 600 via an API 602 to request allocation of one or more resource instances within the virtual network or within another virtual network.

Illustrative Systems

Figure 7:
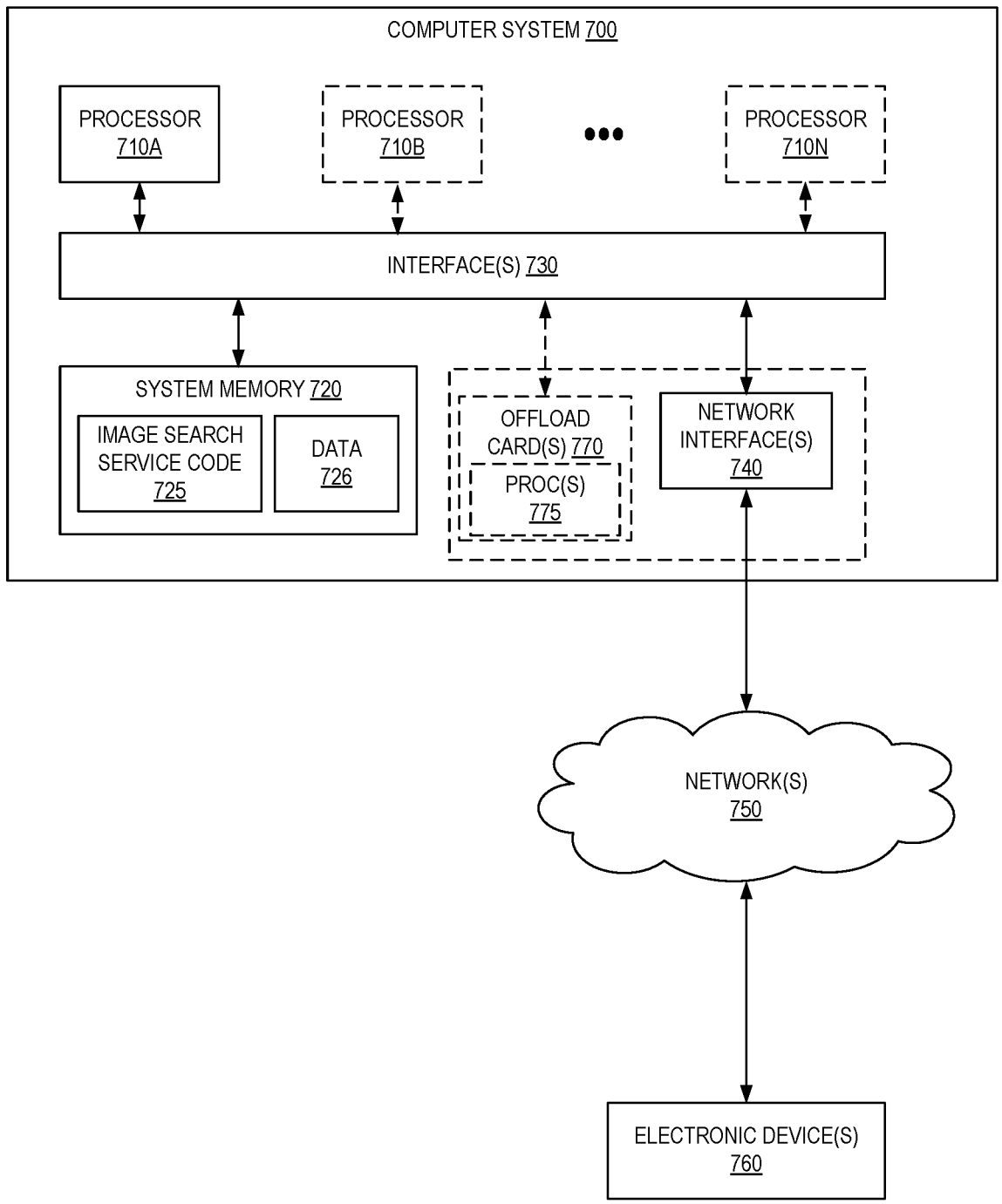
FIG. 7 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 700 illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as image search service code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 618A-618N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a first set of face embeddings from a dataset of images using a first embedding model;
training a second, different embedding model to generate a second set of face embeddings generated by the second, different embedding model that are compatible with the first set of face embeddings generated from the dataset of images by the first embedding model;
generating a third set of face embeddings from a query image from a user using the second, different embedding model;
performing a search of the third set of face embeddings from the query image in the first set of face embeddings of the dataset of images using a classifier model to generate a result; and
returning the result to the user.

2. The computer-implemented method of claim 1, wherein the training comprises using a classifier model of the first embedding model as a training constraint of the training of the second, different embedding model.

3. The computer-implemented method of claim 1, wherein the performing the search occurs before generating a set of face embeddings for the dataset of images using the second, different embedding model.

4. A computer-implemented method comprising:
generating a first set of features from a dataset of images using a first embedding model;
training a second, different embedding model to generate a second set of features generated by the second, different embedding model that are compatible with the first set of features generated from the dataset of images by the first embedding model;
generating a third set of features from a query image from a user using the second, different embedding model;
performing a search of the third set of features from the query image in the first set of features of the dataset of images using a classifier model to generate a result; and
returning the result to the user.

5. The computer-implemented method of claim 4, wherein the training comprises using a classifier model of the first embedding model as a training constraint of the training of the second, different embedding model.

6. The computer-implemented method of claim 4, further comprising generating a fourth set of features from the dataset of images using the second, different embedding model, wherein the performing the search comprises performing the search of the third set of features from the query image in the first set of features of the dataset of images and in the fourth set of features of the dataset of images to generate the result.

7. The computer-implemented method of claim 4, wherein the performing the search occurs before generating a set of features for the dataset of images using the second, different embedding model.

8. The computer-implemented method of claim 4, further comprising training the first embedding model on a training dataset, and the second, different embedding model on the training dataset.

9. The computer-implemented method of claim 4, further comprising training the first embedding model on a first training dataset, and the second, different embedding model on a second, different training dataset.

10. The computer-implemented method of claim 4, wherein an embedding dimension of the first embedding model is different than an embedding dimension of the second, different embedding model.

11. The computer-implemented method of claim 4, wherein an architecture of the first embedding model is different than an architecture of the second, different embedding model.

12. The computer-implemented method of claim 4, wherein the result comprises an indication of a most probable object depicted in the query image.

13. The computer-implemented method of claim 9, wherein the training of the second, different embedding model on the second, different training dataset comprises generating classifier weights for one or more classes of images in the second, different training dataset that are not in a set of classes of images in the first training dataset.

14. The computer-implemented method of claim 9, wherein the training of the second, different embedding model on the second, different training dataset comprises not generating classifier weights for one or more classes of images in the second, different training dataset that are not in a set of classes of images in the first training dataset.

15. A system comprising:
a first one or more electronic devices to implement a storage service in a multi-tenant provider network to store a dataset of images; and
a second one or more electronic devices to implement a search service in the multi-tenant provider network, the search service including instructions that upon execution cause the search service to perform a method comprising:
generating a first set of features from the dataset of images using a first embedding model,
training a second, different embedding model to generate a second set of features generated by the second, different embedding model that are compatible with the first set of features generated from the dataset of images by the first embedding model,
generating a third set of features from a query image from a user using the second, different embedding model,
performing a search of the third set of features from the query image in the first set of features of the dataset of images using a classifier model to generate a result, and
returning the result to the user.

16. The system of claim 15, wherein the training comprises using a classifier model of the first embedding model as a training constraint of the training of the second, different embedding model.

17. The system of claim 15, wherein the performing the search occurs before generating a set of features for the dataset of images using the second, different embedding model.

18. The system of claim 15, wherein an embedding dimension of the first embedding model is different than an embedding dimension of the second, different embedding model.

19. The system of claim 15, wherein an architecture of the first embedding model is different than an architecture of the second, different embedding model.

20. The system of claim 15, wherein the result comprises an indication of a most probable person depicted in the query image.

* * * * *